United States Patent [19]
Grimes

[11] Patent Number: 5,185,190
[45] Date of Patent: Feb. 9, 1993

[54] CYLINDRICAL FILTERS AND THEIR MANUFACTURE

[75] Inventor: Michael Grimes, Hampshire, England

[73] Assignee: Pall Corporation, Glen Cove, N.Y.

[21] Appl. No.: 642,652

[22] Filed: Jan. 17, 1991

[30] Foreign Application Priority Data

Jan. 18, 1990 [GB] United Kingdom ............... 9001141

[51] Int. Cl.⁵ .......................................... B01D 29/07
[52] U.S. Cl. ................... 428/36.91; 428/59; 210/493.1; 210/493.2; 210/493.5; 210/497.01; 210/489; 210/323.2
[58] Field of Search ............... 428/34.1, 34.7, 36.9, 428/36.91, 59; 210/323.2, 323.1, 340, 344, 346, 493.1, 493.2–493.5, 497.01, 489

[56] References Cited

U.S. PATENT DOCUMENTS

| | | | |
|---|---|---|---|
| 3,865,919 | 1/1980 | Pall et al. | 264/259 |
| 4,089,783 | 5/1978 | Holyoak | 210/358 |
| 4,172,797 | 10/1979 | Rublchavd et al. | 210/443 |
| 4,184,966 | 2/1975 | Pall et al. | 210/493 |
| 4,312,648 | 1/1982 | Day | 55/378 |
| 4,578,191 | 3/1986 | Jaffrin et al. | 210/323.2 |
| 4,609,465 | 9/1986 | Miller | 210/323.2 |
| 4,747,946 | 5/1988 | Ikeyama et al. | 210/321.8 |
| 4,963,258 | 10/1990 | Yagishita | 210/315 |
| 5,015,377 | 5/1991 | Silvera | 210/323.2 |

FOREIGN PATENT DOCUMENTS

| | | |
|---|---|---|
| 0062867 | 10/1982 | European Pat. Off. |
| 9073014 | 10/1982 | Japan |
| 1031570 | 6/1966 | United Kingdom |
| 2101902 | 1/1983 | United Kingdom |

Primary Examiner—Ellis P. Robinson
Assistant Examiner—Charles R. Nold
Attorney, Agent, or Firm—Leydig, Voit & Mayer

[57] ABSTRACT

A cylindrical filter is formed from a sheet of filter material which includes two connected layers of filter media. Opposed edges of the sheet are joined to form the cylinder by separating the media adjacent the edges and then sealing together the first of the separated layers followed by sealing the second of the separated layers. The two seals are spaced inwardly of the edges and are spaced from one another. In this way, failure of one seal does not result in failure of the cylindrical filter.

18 Claims, 4 Drawing Sheets

CYLINDRICAL FILTERS AND THEIR MANUFACTURE

BACKGROUND TO THE INVENTION

1. Field of the Invention

The invention relates to cylindrical filters and their manufacture.

A cylindrical filter is customarily formed from a sheet of filter media joined along two opposed edges to form the cylinder. The media may be in the form of a plain sheet or the sheet may be corrugated, in which case the joined edges are the final corrugations.

2. Brief Review of the Prior Art

The joint is customarily made by contacting the areas of the sheet adjacent the two edges and then forming a seal between these areas. In general, the overlap will be with the edges in register, particularly where the sheet is pleated. Such a sealed joint is acceptable where the sheet is formed from a single layer of filter media. It is, however, less satisfactory where the sheet is formed from two superimposed layers of media connected together. In this case, the possibility of a flow path through a single seal is increased.

In EP-A1-0001407 there is disclosed the joining of the edges of a sheet formed of two superimposed layers of media connected together and utilizing a channel strip for connecting the layers of media together. In US-A-3865919 a number of corrugations of a pleated sheet of filter material are bonded together and then provided with a tape or ribbon of adhesive in a space formed between the corrugations. The adhesive is melted to form a leak-proof seal.

SUMMARY OF THE INVENTION

According to one aspect of the invention, a pleated cylindrical filter element comprises a sheet of filter material including at least first and second layers of filter media. Each of the first and second layers of filter media have first and second edges. A portion of the first media layer near the first edge and a portion of the first filter media layer near the second edge are sealed by a first seal spaced inwardly of and extending along the length of the edges. A portion of the second filter media layer near the first edge and a portion of the second filter media layer near the second edge are sealed by a second seal spaced inwardly of and extending along the length of the edges. The second seal is also spaced from the first seal.

According to a second aspect of the invention, a pleated cylindrical filter comprises a sheet of filter material including at least first, second, and third layers of filter media. Each layer of filter media has first and second edges. A portion of the first filter media layer near the first edge and a portion of the first filter media layer near the second edge are sealed by a first seal which is spaced inwardly of and extends along the length of the edges. A portion of the second filter media layer near the first edge and a portion of the second filter media layer near the second edge are sealed by a second seal which is spaced inwardly of and extends along the length of the edges. The second seal is spaced from the first seal. A portion of the third filter media layer near the first edge and a portion of the third filter media layer near the second edge are sealed by a third seal which is spaced inwardly of and extends along the length of the edges. The third seal is spaced from the first and second seals.

According to a third aspect of the invention, a pleated cylindrical filter comprises a sheet of filter material including at least first, second, and third layers of filter media. Each layer of filter media has first and second edges. A portion of the first filter media layer near the first edge and a portion of the first filter media layer near the second edge are sealed by a first seal which is spaced inwardly of and extends along the length of the edges. Portions of the second and third filter media layers near the first edge of each layer and portions of the second and third filter media layer near the second edge of each layer are sealed by a second seal which is spaced inwardly of and extends along the length of the edges. The second seal is spaced from the first seal.

The following is a more detailed description of some embodiments of the invention, by way of example, reference being made to the accompanying drawings in which:

DESCRIPTION OF THE PREFERRED EMBODIMENTS

Figure 1:
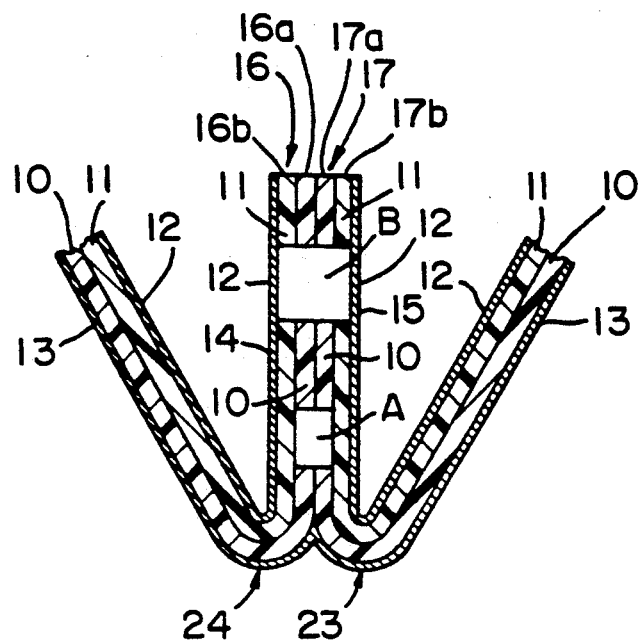
FIG. 1 is a cross-sectional view of part of a cylindrical pleated filter formed from a sheet of filter material including two connected layers of filter media and joined at the final corrugations.

Referring first to FIG. 1, the cylindrical filter is formed from a sheet of filter material having two layers of filter media 10,11 which overlie one another and which are connected to one another. These layers 10,11 are covered by upstream and downstream drainage material 12,13. The layers of filter media are of nylon.

The sheet is corrugated to form two final corrugations 14,15, which both extend in the same direction and terminate at respective edges 16,17.

The sheet is formed into a cylinder in the following way.

First, the downstream drainage material 13 is removed from the first media layer 10 inwardly of the edges 16,17 and along the length of the edges 16,17. The first and second media layers 10,11 and the upstream drainage material 12 are then separated at the edges 16,17 for the complete height of the final corrugations 14,15 and along the complete length of the final corrugations 14,15 to form three separate layers, each of the filter media layers 10,11 having its respective edges 16a, 17a, 16b, 17b.

Figure 2:
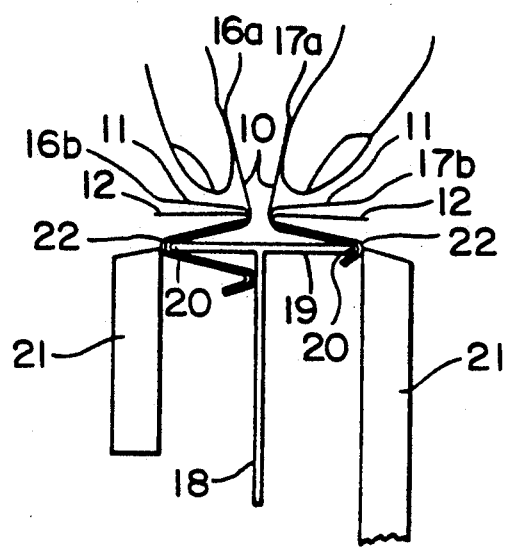
FIG. 2 is a diagrammatic view of a holder holding the ends of the pleated sheet shown in FIG. 1 before joining and showing a first stage in the joining process.

The corrugated sheet with the separated layers is then mounted in the holder shown in FIG. 2. This holder comprises a member 18 of T-shaped cross-section with the head 19 of the T movable so that the edges 20 of the head can engage with and disengage from respective supports 21. The width of the head is generally equal to twice the height of the corrugation of the completed sheet with which it is designed to be used.

The penultimate folds 22 of the sheet, prepared as described above, are arranged around the edges 20 of the head 19 of the member 18 and engaged with the supports 21. This ensures that the two edges 16,17 are parallel.

Figure 3:
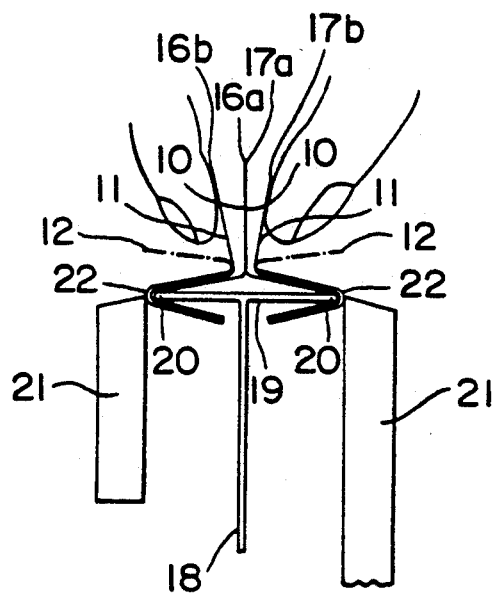
FIG. 3 is a similar view to FIG. 2, but showing a second stage in the joining process.

The two separated first layers 10 are then brought together by manual manipulation, as seen in FIG. 2. As shown in FIG. 3, the edges 16a, 17a of the first layer 10 are in register. These layers are then sealed together between heated jaws to form a seal extending parallel to the edges 16a,17a and inwardly of the edges. The position and width of this seal are designated by the letter A in FIG. 1 and it will be seen that the seal is adjacent the final folds 23,24 of the pleated sheet.

Referring next to FIG. 3, the second layers are then positioned manually to overlie the joined first layers 10 so that the edges 16b,17b of the second layer 11 as well as the edges 16a,17a of the first layer 10 are all in register, as shown in FIG. 1. The layers 10,11 are then placed within jaws which form a second seal extending inwardly of the edges 16,17 parallel to said edges and spaced from the first seal A. This seal connects together all of the layers. The width and position of this seal are indicated by the letter B in FIG. 1 and it will be seen that this seal is between the first seal A and the edges 16,17.

Finally, the upstream drainage material 12 is re-assembled over the second layers 11.

There is thus formed a pleated cylindrical filter in which the final corrugations are joined inwardly of their edges by two parallel but spaced seals A,B. If the seal B should fail in its central portion, the seal A will still remain. If the seal B should fail towards its outer edges, leaking material will still have to pass through the filter media. In addition, longitudinal strength is increased and there is an increase of strength in a cartridge in which the corrugated filter is incorporated.

Six pleated cylindrical filters prepared as described above with reference to the drawings were tested in the following way.

All six cartridges were placed in an autoclave at 140° C. for four periods of one hour each. All six cartridges were tested for forward flow before the four one hour cycles and after the four one hour cycles. The filters were tested water wet at 2.61 kPa (18 psi).

An acceptable production limit for such forward flow is 10 ml/min and an acceptable limit in use is 22 ml/min.

The results were as follows:

| Filter No | FORWARD FLOW IN MLS/MIN | |
|---|---|---|
| | Before Steaming | After Steaming |
| 1 | 1.97 | 1.30 |
| 2 | 2.05 | 1.60 |
| 3 | 2.13 | 1.00 |
| 4 | 2.07 | 1.38 |
| 5 | 2.17 | 1.18 |
| 6 | 1.93 | 1.25 |

It will thus be seen that all filters remain well within the acceptable limits after autoclaving. This indicates that there has been no failure of the seals.

It will be appreciated that the method of manufacture and construction described above need not be applied to pleated filters, it could be applied to filters in which no pleats are provided. Further, the join may not be with the two edges in register, it could be with the two edges overlapping.

Figure 4:
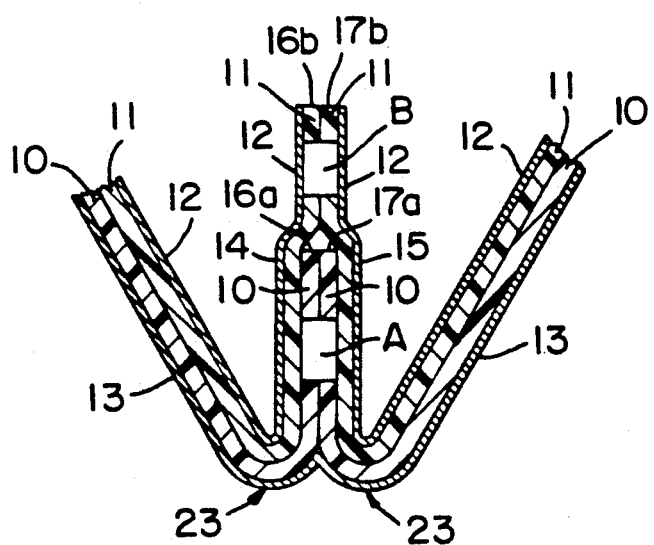
FIG. 4 is a similar view to FIG. 1, but showing a second form of join between the final corrugations.

A second form of join is shown in FIG. 4. Aspects of this join and the join described above with reference to FIGS. 1 to 3 are the same and these aspects will not be described in detail.

In this second form of join, the first seal A is formed as described above with reference to FIGS. 1 to 3. However, after formation of this seal A, the portions of the first media layer 10 between the seal A and the edges 16b,17b of the second media layer 11 are cut-away. As shown in FIG. 4, the edges 16a, 17a of the first layer 10 are in register and are spaced from the edges 16b,17b of the second layer 11, which are also in register.

Thus, when the second media layers 11 are positioned as shown in FIG. 3, these layers 11 only partially overlie the first media layers 10 and portions of the second media layers 11 are in contact. The second seal B is formed between these contacting second media layer portions 11, as shown in FIG. 4.

The upstream drainage material 12 is then re-assembled.

Figure 5:
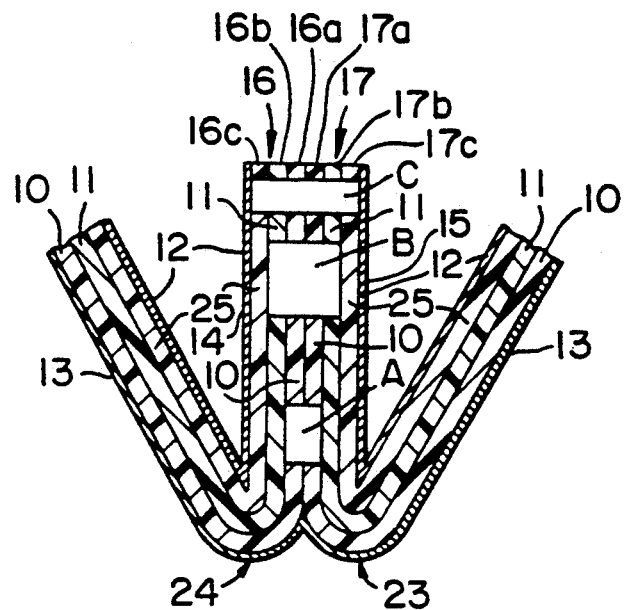
FIG. 5 is a similar view to FIG. 1 but showing a sheet of filter media formed from three connected layers of media and three seals, the seals connecting two, four and six layers of media respectively.
Figure 6:
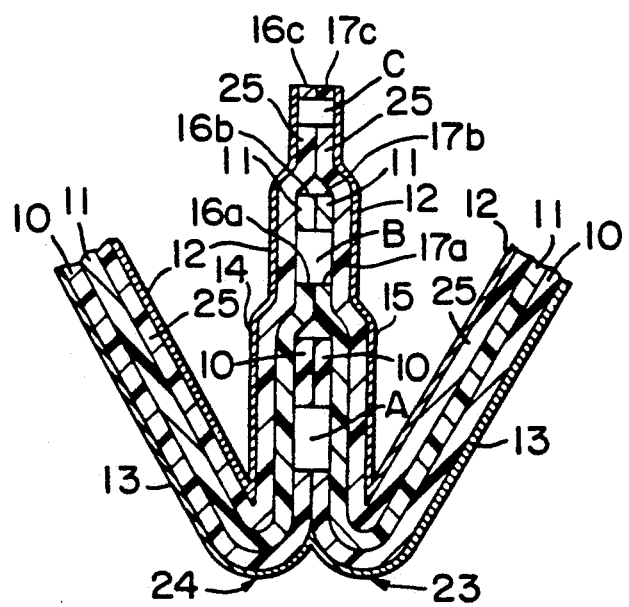
FIG. 6 is a similar view to FIG. 4 but showing a sheet of filter media formed from three connected layers of media and three seals, each seal connecting two of the layers.

It will be appreciated that filters having three or more media layers may be joined by either of the methods described above with reference to the drawings. In such cases, the media layers may all be separated and joined successively in pairs by spaced seals, so that there are as many seals as layers. This is shown in FIGS. 5 and 6 where parts common to FIGS. 1 and 4 and to FIGS. 5 and 6 will be given the same reference numerals and will not be described in detail. In these embodiments, the cylindrical filter is formed from a sheet of filter material having three layers of filter media 10,11,25 which overlie one another and are connected to one another. The layers of filter media 10,11,25 are of nylon.

The sheet is corrugated to form two final corrugations 14,15, which both extend in the same direction and terminate at respective edges 16,17.

The sheet of FIG. 5 is formed into a cylinder in the way described above with reference to FIG. 1 except that the third media layer 25 is also separated at the edges 16,17 for the complete height of the final corrugations 14,15 and along the complete length of the final corrugations 14,15 to form six separate layers.

The layers 10,11 are joined as described above with reference to the drawings. The two portions of the separated third layer 25 are then brought together by manual manipulation. As shown in FIG. 5, both edges 16a, 17a, 16b, 17b, 16c, 17c of all of the filter media layers 10, 11, 25 are in register. The layers are then sealed together between heated jaws to form a seal extending parallel to the edges 16,17 and inwardly of the edges. The position and width of this seal are designated by the letter C in FIG. 5 and it will be seen that the seal is adjacent the final folds, and closer to the edges 16,17 than the previously formed seals A,B.

Finally, the upstream drainage material 12 is reassembled over the second layers 11.

There is thus formed a pleated cylindrical filter in which the final corrugations are joined inwardly of their edges by three parallel but spaced seals A,B,C. If the seal C should fail in its central portion, the seals A and B will still remain. If the seal C should fail towards its outer edges, leaking material will still have to pass through the filter media. In addition, longitudinal strength is increased and there is an increase of strength in a cartridge in which the corrugated filter is incorporated.

The second form of join is shown in FIG. 6. Aspects of this join and the join described above with reference to FIGS. 1 to 5 are the same and these aspects will not be described in detail.

In this second form of join, the first seal A and the second seal B are formed as described above with reference to FIG. 4. However, after formation of the second seal B, the portions of the second media layer 11 between the seal B and the edges 16c,17c of the third media layer 25 are cut-away. As shown in FIG. 6, the edges 16b,17b of the second layer 11 are in register and are spaced from the edges 16c,17c of the third layer 25, which are also in register.

Thus, when the portions of the third media layer 25 are positioned as shown in FIG. 6, these portions only partially overlie the first and second media layers 10,11 and are in contact. The third seal C is formed between these contacting third media layer portions 25, as shown in FIG. 6.

Alternatively, two layers (or more where there are four or more layers) near each edge may be joined together so that there are less seals than layers. This is shown in FIGS. 7 and 8 where parts common to FIGS. 1 to 6 and to FIGS. 7 and 8 will be given the same reference numerals and will not be described in detail.

Figure 7:
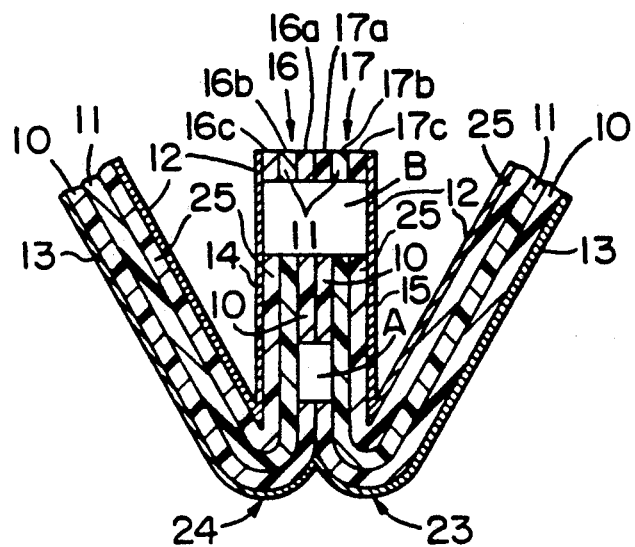
FIG. 7 is a similar view to FIG. 5 but showing only two seals, one seal connecting two layers and the other seal connecting all six layers.

In FIG. 7, the third media layer 25 is not separated from the second media layer 11 and the portions near the edges 16b,17b,16c,17c of these two layers 11,25 are sealed together as one, as described above with reference to FIGS. 2 and 3. There are thus only two seals A,B, with the same seal A connecting two portions of the first media layer 10, and the other seal B connecting all six portions of all of the media layers 10,11,25.

Figure 8:
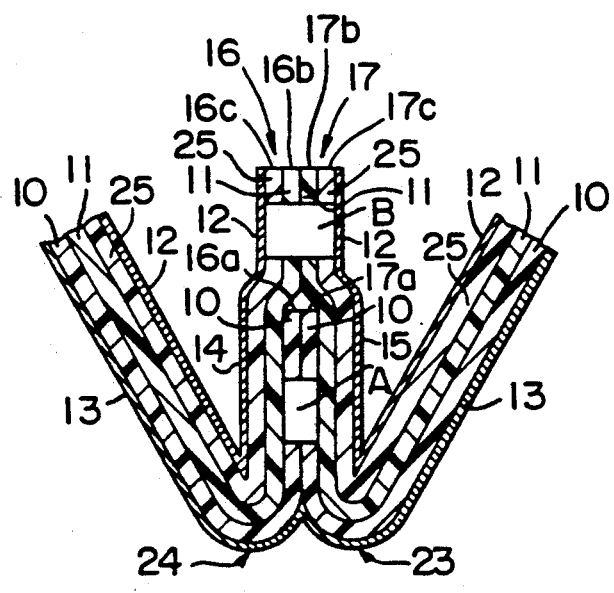
FIG. 8 is a similar view to FIG. 6 but showing only two seals, one seal connecting two layers and the other seal connecting the remaining four layers.

In FIG. 8, the third media layer 25 is not separated from the second media layer 11 and the portions near the edges 16b,17b,16c,17c of these two layers are sealed together as one, as described above with reference to FIG. 4. There are only two seals A,B with the inner seal connecting the two inner media layers 10, and the outer seal connecting the four portions of the remaining media layers 11,25.

What is claimed is:

1. A pleated cylindrical filter comprising a sheet of filter material including at least first and second layers of filter media, each having first and second edges, wherein a portion of the first layer near the first edge and a portion of the first layer near the second edge are sealed by a first seal spaced inwardly of and extending along the length of the edges, and a portion of the second layer near the first edge and a portion of the second layer near the second edge are sealed by a second seal spaced inwardly of and extending along the length of the edges and spaced from the first, whereby the sheet of the filter material is formed into a cylinder.

2. A pleated cylindrical filter according to claim 1 wherein the first and second edges of each layer are in register and a portion of the first layer near the first edge is sealed to a portion of the first layer near the second edge by said first seal and the portions of the second layer near the first and second edges are sealed by the second seal.

3. A pleated cylindrical filter according to claim 2 wherein the registered edges of the first layer are spaced from the registered edges of the second layer so that the portions of the second layer are in contact, the second seal being between said contacting portions.

4. A pleated cylindrical filter according to claim 2 wherein the edges of the second layer are in register with the edges of the first layer so that the second seal seals together the first and second layers.

5. A pleated cylindrical filter according to claim 2 wherein the second seal is positioned between the first seal and the registered edges of the second layer.

6. A pleated cylindrical filter according to claim 2 wherein the sheet of filter material is corrugated with the seals being formed between final corrugations of the sheet.

7. A pleated cylindrical filter according to claim 6 wherein the first seal is adjacent the final folds.

8. A pleated cylindrical filter according to claim 2 wherein the first layer is downstream from the second layer.

9. A pleated cylindrical filter according to claim 2 wherein the sheet of filter material includes a layer of surface drainage material on both surfaces thereof.

10. A pleated cylindrical filter according to claim 9 wherein the layers of surface drainage material are not sealed to the layers of filter media.

11. A pleated cylindrical filter according to claim 1 wherein the layers of filter media include nylon.

12. A pleated cylindrical filter comprising a sheet of filter material including, at least first, second and third layers of filter media, each having first and second edges; wherein a portion of the first layer near the first edge and a portion of the first layer near the second edge are sealed by a first seal which is spaced inwardly of and extends along the length of the edges; wherein a portion of the a second layer near the first edge and a portion of the second layer near the second edge are sealed by a second seal which is spaced inwardly of and extends along the length of the edges and is spaced from said first seal; and wherein a portion of the third layer near the first edge and a portion of the third layer near the second edge are sealed by a third seal which is spaced inwardly of and extends along the length of the edges and is spaced from the first and second seals, whereby the sheet of filter material is formed in a cylinder.

13. A pleated cylindrical filter according to claim 12 wherein the edges of the first layer, the edges of the second layer and the edges of the third layer are in register so that the second seal seals together the first and second layers and the third seal seals together the first, second and third layers.

14. A pleated cylindrical filter according to claim 12 wherein the edges of the first layer are spaced from the edges of the second layer so that the portions of the second layer are in contact, said second seal contacting portions of the second layer and wherein the edges of the second layer are spaced from the edges of the third layer so that the portions of the third layer are in contact, said third seal sealing the contacting portions of the third layer.

15. A pleated cylindrical filter comprising a sheet of filter material including at least first, second and third layers of filter media, each having first and second edges; wherein a portion of the first layer near the first edge and a portion of the first layer near the second edge are sealed by a first seal which is spaced inwardly of and extends along the length of the edges, wherein portions of the second layer and third layer near the first edge of each layer and portions of the second layer and third layer near the second edge of each layer are sealed by a second seal which is spaced inwardly of and extends along the length of the edges and is spaced from the first seal, whereby the sheet of filter material is formed in a cylinder.

16. A pleated cylindrical filter according to claim 15 wherein the second seal is positioned between said first seal and the edges of the second and third layers.

17. A pleated cylindrical filter according to claim 15 wherein the edges of the first layer, the edges of the second layer and the edges of the third layer are in register so that the second seal seals together the first, second and third layers.

18. A pleated cylindrical filter according to claim 15 wherein the edges of the first layer are spaced from the edges of the second and third layers so that the portions of the second layers, the second seal sealing the contacting portions of the second layers and sealing together the second and the third layers.

* * * * *

UNITED STATES PATENT AND TRADEMARK OFFICE
CERTIFICATE OF CORRECTION

PATENT NO. : 5,185,190

DATED : February 9, 1993

INVENTOR(S) : Michael Grimes

It is certified that error appears in the above-identified patent and that said Letters Patent is hereby corrected as shown below:

On title page,

Item [56], References Cited, change "4,172,797 10/1979 Rublchavd et al.........210/443 to --4,172,797 10/1979 Rubichavd et al. ........210/443--.

Claim 1, col. 6, line 1, after "first" insert --seal--.

Signed and Sealed this

Tenth Day of January, 1995

Attest:

BRUCE LEHMAN

Attesting Officer

Commissioner of Patents and Trademarks